April 7, 1931. C. W. WEISS 1,799,660
UNIVERSAL JOINT
Filed July 27, 1928
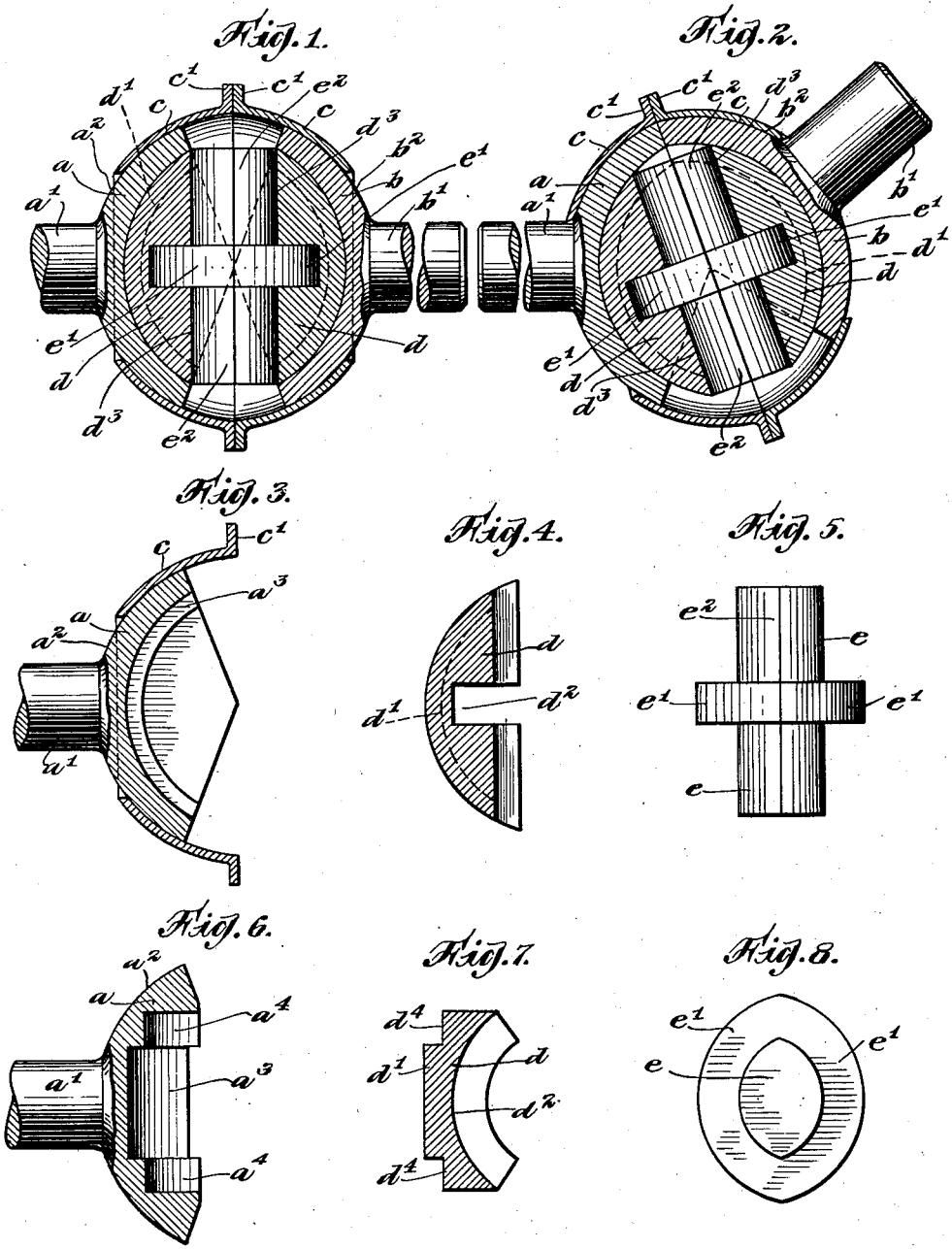

Patented Apr. 7, 1931

1,799,660

UNITED STATES PATENT OFFICE

CARL W. WEISS, OF NEW YORK, N. Y.

UNIVERSAL JOINT

Application filed July 27, 1928. Serial No. 295,640.

This invention relates to universal joints of constant angular velocity of the general type of that shown in Letters Patent of the United States, No. 1,522,351 dated January 6, 1925. In the universal joint shown in that patent constant angular velocity of the driven member, as well as of the driving member, is attained by a construction such that the relatively movable body through which motion is transmitted from one member to the other has its center in a plane which bisects the angle of displacement of the axes of the two members, the proximate faces of the two members being formed with grooves which intersect at an angle and receive the relatively movable member between them. The object of the present invention is also to provide a joint of constant angular velocity but in this instance the desired result is attained by forming the joint with five parts, which for convenience may be termed two main members, two coacting elements, and a central element common to both of the coacting elements, each main member and its coacting element being formed for interengagement in such manner as to permit relative rotary displacement in a plane at right angle to the first mentioned plane. Means are provided for maintaining the several parts in operative relation, such means conveniently taking the form of a housing applied to the two main members. In this construction the axis of the central or common element bisects the angle of displacement of the axes of the two main members and the interengagement, in the manner described, of the main members, the coacting elements and the common element, and, while permitting the angular displacement of the two main members and the simultaneous rotation of both about their respective axes, provides for the transmission of force from one main member to the other at constant angular velocity.

The invention will be more fully explained with reference to the accompanying drawing in which the chosen embodiment of the invention is illustrated and in which:

Figure 1 is a view in sectional elevation with the axes of the two main members in alignment.

Figure 2 is a similar view, but with the two main members angularly displaced.

Figure 3 is a detail view in section of one of the main members and the corresponding part of the housing.

Figure 4 is a detail view in section of one of the coacting elements in position for engagement with the main member shown in Figure 3, the plane of section being the same as that of Figure 3.

Figure 5 is a view in elevation of the central element in position for interengagement with the coacting element shown in Figure 4.

Figure 6 is a view in section of the main member shown in Figure 3, the plane of section being at right angle to that of Figure 3.

Figure 7 is a view in section of the coacting element shown in Figure 4, the plane of section being at a right angle to that of Figure 4.

Figure 8 is an end view of the common element shown in Figure 5.

Each of the two main members $a$, $b$ is represented as having the shaft member $a^1$, $b^1$ formed integral therewith and as having its external surface $a^2$, $b^2$ spherically formed to receive a spherical housing composed of two parts $c$, $c$, which may be flanged, as at $c^1$, in order that they may be secured together. In the construction illustrated each main member $a$, $b$ is shown as having a groove $a^3$ formed in the arc of a circle and each coacting element $d$ is shown as having a rib $d^1$, also formed in the arc of a circle, for interengagement with the corresponding main member in such manner as to permit relative rotary displacement of the main member and the coacting element in one plane. Each coacting element $d$ is also shown as having on its opposite face a groove $d^2$ also formed in the arc of a circle but in a plane at a right angle to that of the rib $d^1$. The central element $e$, common to both coacting elements $d$, is shown as of ovate cross-section, with the centers of curvature of opposite sides lying respectively on the further side of the center of the joint, and as having on each face a rib $e^1$ for interengagement with the groove $d^2$ of the element $d$. The end portions of the element $e$ are received for bearing in the concave faces $d^3$ of the element $d$, and the end portions $d^4$ of the element $d$ are received for bearing in the concave seats $a^4$ of the main members $a$ and $b$. By reason of the ovate cross-section of the common element $e$, the centers of curvature of the opposite sides of which lie respectively on the further side of the center of the joint, such common element, in the event of relative displacement of the main members of the joint, permits movement of the coacting intermediate members and itself is compelled to take a position such that its axis bisects the angle of displacement of the joint and thereby, while permitting such angular displacement of the main members and the simultaneous rotation of both, assures the transmission of force from one main member to the other at constant angular velocity.

It will be observed that the parts of the joint are readily formed and machined and that they are easily assembled and held in operative relation by suitable means, such as the two-part housing $c$ which permits free rotation and free relative angular displacement of the two main members, while the interengagement of the main members with the coacting elements and of the coacting elements with the common element in planes at right angles provides for transmission of power from one main member to the other while permitting free rotation and angular displacement.

It will be understood that changes in form and arrangement of parts can be made to suit different conditions of use and that, except as pointed out in the claims, the invention is not limited to the particular construction shown and described herein.

I claim as my invention:

1. A universal joint having two main members capable of relative angular displacement, two coacting elements, and a central, common element of ovate cross-section, the centers of curvature of the opposite sides of which lie respectively on the further side of the center of the joint, each main member and each coacting element being formed on their proximate surfaces for interengagement to permit relative rotary displacement in one plane, and each coacting element and central element common to both being formed on their proximate surfaces for interengagement to permit relative rotary displacement in a plane at a right angle to the first mentioned plane.

2. A universal joint having two main members capable of relative angular displacement, two coacting elements, and a central, common element of ovate cross-section, the centers of curvature of the opposite sides of which lie respectively on the further side of the center of the joint, each main member and each coacting element being formed on their proximate surfaces for interengagement to permit relative rotary displacement in one plane, and each coacting element and central element common to both being formed on their proximate surfaces for interengagement to permit relative rotary displacement in a plane at a right angle to the first mentioned plane, and means to maintain the several parts in operative relation.

3. A universal joint having two main members capable of relative angular displacement, two coacting elements, and a central, common element of ovate cross-section, the centers of curvature of the opposite sides of which lie respectively on the further side of the center of the joint, each main member and each coacting element being formed on their proximate surfaces for interengagement to permit relative rotary displacement in one plane, and each coacting element and central element common to both being formed on their proximate surfaces for interengagement to permit relative rotary displacement in a plane at a right angle to the first mentioned plane, and a housing having a spherical bearing on the external surfaces of the main members and serving to maintain the several parts in operative relation.

This specification signed this 25th day of July, A. D. 1928.

CARL W. WEISS.